(12) United States Patent
Courtney et al.

(10) Patent No.: US 7,167,442 B2
(45) Date of Patent: *Jan. 23, 2007

(54) HITLESS PROTECTION SWITCHING

(75) Inventors: John Courtney, Belfast (GB); David M. Goodman, St Albans (GB); Mark Carson, Belfast (GB)

(73) Assignee: Nortel Networks Limited, St. Laurent (CA)

(*) Notice: Subject to any disclaimer, the term of this patent is extended or adjusted under 35 U.S.C. 154(b) by 970 days.

This patent is subject to a terminal disclaimer.

(21) Appl. No.: 09/862,864

(22) Filed: May 22, 2001

(65) Prior Publication Data

US 2002/0176432 A1 Nov. 28, 2002

(51) Int. Cl.
*H04J 3/14* (2006.01)
*H04L 12/26* (2006.01)
*G06F 11/00* (2006.01)

(52) U.S. Cl. .................. 370/217; 370/228; 714/4

(58) Field of Classification Search .......... 370/907, 370/352, 460, 227, 395.71, 216, 217, 218, 370/219, 220, 221, 222, 223, 224, 225, 226, 370/228, 395.1; 398/4; 714/4
See application file for complete search history.

(56) References Cited

U.S. PATENT DOCUMENTS

| | | | | |
|---|---|---|---|---|
| 5,103,447 | A * | 4/1992 | Takiyasu et al. | 370/460 |
| 5,367,520 | A * | 11/1994 | Cordell | 370/395.71 |
| 5,428,609 | A * | 6/1995 | Eng et al. | 370/392 |
| 5,577,196 | A * | 11/1996 | Peer | 714/4 |
| 5,602,828 | A * | 2/1997 | Engdahl et al. | 370/228 |
| 5,793,745 | A * | 8/1998 | Manchester | 370/224 |
| 6,195,330 | B1 * | 2/2001 | Sawey et al. | 370/220 |
| 6,195,704 | B1 * | 2/2001 | Suita | 709/239 |
| 6,222,653 | B1 * | 4/2001 | Asahi | 398/4 |

(Continued)

FOREIGN PATENT DOCUMENTS

EP 0 696 111 A2 2/1996

(Continued)

OTHER PUBLICATIONS

Jones N et al: "A Proposal for SONET Standards on Virtual Concatenation of High Order and Low Order SPEs", T1X1.5, Jan. 17, 2000, XP-002150418.

(Continued)

*Primary Examiner*—Alpus H. Hsu
(74) *Attorney, Agent, or Firm*—Barnes & Thornburg LLP

(57) ABSTRACT

The invention provides a method and apparatus for providing hitless protection switching in a synchronous transmission system. A switching apparatus is arranged to receive data signals on at least two transmission paths and to output data from a selected one of said transmission paths. The apparatus is arranged to align the respective received data signals so that a selector mechanism can select between corresponding elements of the received data signals. This arrangement allows hitless switching to be performed since there is no loss or repetition of signal elements when switching occurs. In a preferred embodiment, data in respect of each frame of each data signal is stored and the selector mechanism selects between paths on a frame-by-frame basis by comparing quality information carried by the data signals. This arrangement offers a very low end to end Bit Error Rate (BER) performance.

21 Claims, 4 Drawing Sheets

U.S. PATENT DOCUMENTS

| | | | |
|---|---|---|---|
| 6,246,668 B1 * | 6/2001 | Kusyk | 370/228 |
| 6,256,292 B1 * | 7/2001 | Ellis et al. | 370/227 |
| 6,504,963 B1 * | 1/2003 | Fang et al. | 385/16 |
| 6,515,962 B1 * | 2/2003 | Sawey et al. | 370/228 |
| 6,654,368 B1 * | 11/2003 | Smith et al. | 370/376 |
| 6,671,271 B1 * | 12/2003 | Takemura et al. | 370/352 |
| 6,674,755 B1 * | 1/2004 | Potter et al. | 370/395.1 |
| 6,795,393 B1 * | 9/2004 | Mazzurco et al. | 370/217 |
| 6,917,630 B1 * | 7/2005 | Russell et al. | 370/532 |

FOREIGN PATENT DOCUMENTS

| | | |
|---|---|---|
| EP | 0 999 653 A2 | 5/2000 |

OTHER PUBLICATIONS

"Interface for the Optical Transport Network (OTN)", ITU-T Recommendation G.709, Feb. 2001, pp. 1-80, XP-002195641.

* cited by examiner

HITLESS PROTECTION SWITCHING

FIELD OF THE INVENTION

The present invention relates to protection switching, particularly in a synchronous transmission system such as a Synchronous Digital Hierarchy (SDH) or Synchronous Optical Network (SONET) system.

BACKGROUND TO THE INVENTION

In a synchronous telecommunications network or system, such as a Synchronous Digital Hierarchy (SDH) or SONET transmission network, traffic data is transported across the network via a transmission path. A path may comprise a number of sections, each section comprising a transport service between two adjacent nodes of the network. Each network node typically comprises a synchronous transmission apparatus, such as a multiplexer, a regenerator or a cross-connect, for receiving the traffic and, where applicable, processing the traffic and transmitting it on to another network node or to a local terminal.

It is common to provide path protection such that the traffic arrives at a destination node via two independent paths namely, a main path and a stand-by path. If, for any reason, the main path should be compromised or should fail, then the stand-by path is selected. Thus, at the destination node, a synchronous transmission apparatus is provided with a respective port for each incoming path and a single port for output of the selected path. The transmission quality of each path is evaluated at the respective ingress port and the results are communicated to the output port. A quality comparison is made at the output port and the path of higher quality is selected for output to the traffic destination. A protection switching apparatus is normally used to switch between the incoming data paths depending on which is selected.

A problem with conventional protection switching is that there is a traffic hit, i.e. an interruption in the traffic stream, whenever a protection switch is performed, irrespective of whether the switch is made as a result of, say, a planned maintenance activity or an equipment or optical fibre failure. A main cause of traffic hits during protection switching results from a differential time delay between the traffic arriving on the respective main and stand-by data paths. The differential time delay can arise for a variety of reasons including the respective physical distances of each data path, and the number and nature of intermediate network apparatus on each path.

Network operator-to-customer and network operator-to-network operator quality of service contracts typically specify required error performances for traffic transmission. In today's networks, a traffic outage of 50 ms during protection switching is considered to be a maximum tolerable level. Failure to meet specified error targets can result in loss of revenue or even loss of contract for a network operator. Hence, there is a need to minimize or eliminate traffic hits resulting from protection switching.

SUMMARY OF THE INVENTION

Accordingly, a first aspect of the present invention provides a switching apparatus, particularly for use in a synchronous transmission system, the apparatus being arranged to receive data signals on at least two transmission paths and to output data from a selected one of said transmission paths, the apparatus including a selector mechanism for selecting between transmission paths, wherein the apparatus is arranged to align the respective data signals received on said transmission paths so that said selector mechanism is able to select between corresponding elements of said received data signals.

This arrangement allows hitless switching to be performed since there is no loss of or repetition of signal elements when switching occurs.

Preferably, said signal alignment is achieved by buffering the received data signals.

Preferably, the apparatus is arranged to receive data signals on a main transmission path and a stand-by transmission path, each path carrying, in use, a substantially identical data signal. Thus, the apparatus allows hitless protection switching between the main and stand-by paths.

Preferably, each element of each received data signal is associated with a tag indicating the position of the element in the data signal, the selector mechanism being arranged to select between elements having corresponding tags, and to cause said output data to comprise said selected elements in sequential order according to the positional information indicated by the respective tags.

Advantageously, said signal elements are comprised in a respective data frame, the selector mechanism being arranged to select between corresponding signal elements on a frame-by-frame basis. Preferably, said signal elements comprise virtual containers.

Preferably, said tags comprise Virtual Concatenation overhead bits.

Preferably, said selector mechanism is arranged to compare the quality of the data signals received on said transmission paths and to select the transmission path of better quality.

Preferably, the apparatus is arranged to store the elements of each received data signal in a respective data buffer. More preferably, the selector mechanism comprises a switching controller arranged to select between transmission paths, and a switch device arranged to retrieve one or more signal elements from the data buffer corresponding to the selected transmission path and to cause the or each retrieved signal element to be output. Further preferably, the switching controller is arranged to select between transmission paths in respect of each signal element. Preferably, the switching controller is arranged to compare the quality of corresponding respective signal elements from each received data signal and to cause the switch device to retrieve the signal element having better quality.

A second aspect of the invention provides a synchronous transmission apparatus comprising a switching apparatus according to the first aspect of the invention.

A third aspect of the invention further provides a synchronous transmission system comprising a first synchronous transmission apparatus arranged to transmit data signals across a network on at least two transmission paths; and a second synchronous transmission apparatus arranged to receive said data signals on said at least two paths, wherein the first synchronous transmission apparatus is arranged to associate each element of each transmitted data signal with a tag indicating the position of the signal element within the data signal, and wherein said second synchronous transmission apparatus comprises a switching apparatus according to the first aspect of the invention.

A fourth aspect of the invention provides a method of switching between transmission paths, the method comprising aligning the respective data signals received on said transmission paths; and selecting between corresponding elements of said received data signals.

A further advantage of the invention is that it enables the production of an output with a very low Bit Error Rate (BER) since the apparatus can select the path of higher quality on a frame-by-frame basis. The result of this is an output signal of very high quality.

The preferred features may be combined as appropriate, as would be apparent to a skilled person, and may be combined with any of the aspects of the invention.

Further advantageous aspects of the invention will become apparent to those ordinarily skilled in the art upon review of the following descriptions of specific embodiments of the invention and with reference to the accompanying drawings.

DETAILED DESCRIPTION OF THE DRAWINGS

Figure 1:
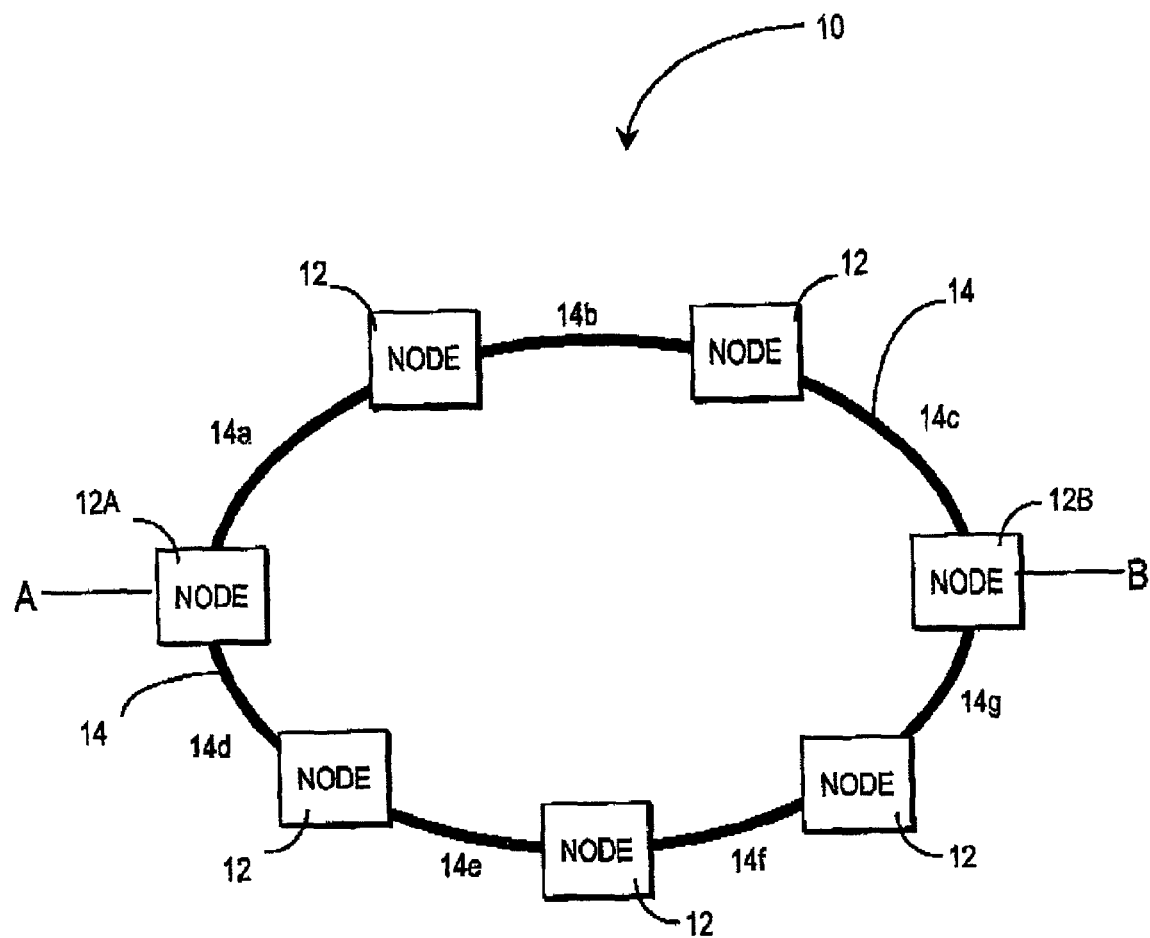
FIG. 1 is a schematic view of a portion of a synchronous transmission system.

Referring now to FIG. 1 of the drawings, there is shown, generally indicated at 10, a schematic representation of a portion of a synchronous transmission system in the form of a network ring. The network ring 10 comprises a plurality of network elements or nodes 12 interconnected by sections 14. Each node 12 comprises a synchronous transmission apparatus, or network equipment, in the form of, for example, a multiplexer, a cross-connect, a regenerator, or other signal processing or switching apparatus.

Data traffic, comprising for example optical or electrical data signals, is carried across the network 10 on a transmission path which may span a plurality of network nodes 12 and sections 14. In an SDH network, traffic is normally carried in a Synchronous Transmission Module (STM). An STM can support one or more transmission paths depending on the capacity of the STM (STM-1, STM-4, STM-16 and STM-64) and on the data signal carried by the path. The data signal can carry data in data structures, or Virtual Containers (VCs), of differing sizes, such as the VC-4 or VC-12. Each path has an associated path overhead (POH) which enables the network equipment to monitor the transmission of the data signal across the whole path and to perform, for example, quality and error checks.

In order to provide path protection, it is usually arranged that data traffic can travel from a traffic source to a traffic destination via more than one independent path. There are two main types of path protection schemes, namely Permanently Bridged protection schemes and Shared Protection schemes. In a Permanently Bridged protection scheme, the source traffic is normally transmitted along two independent paths, namely a main path and a stand-by path. Network equipment at the protection closure point receives the traffic on both the main and stand-by paths and, using the path overhead (POH) data, is able to compare the quality of each path i.e. compare the quality of the respective data signals received on each path. The equipment then selects the path of better quality for sending on to the traffic destination (which may entail local termination or forwarding on to other equipment on the network 10). A Dedicated Protection Ring (DPRing) or a 1+1 MSP (Multiplexed Section Protection) are examples of a Permanently Bridged protection scheme. This is a dedicated path switched ring which sends traffic both ways around the ring, and uses a protection switch mechanism to select one of the main or stand-by paths at the protection closure point upon detection of a loss of quality or failure in the other path.

In a shared protection scheme, the traffic is not normally transmitted along both a main and stand-by path. Instead, when it is necessary to perform protection (path) switching (for example when the main path fails or when it is desired to perform maintenance on the main path) the traffic is switched onto a stand-by path at both the source and destination nodes. A Shared Protection Ring (SPRing) is an example of a Shared Protection scheme. This is a shared Multiplex Section (MS) switched ring which is able to share protection capacity which is reserved all the way around the ring. In the event of failure, protection switches operate on both sides of the failure to route traffic through the spare capacity.

In shared protection schemes it is not possible to perform hitless automatic protection switching because the stand-by path is not available to the destination node until a failure has occurred. However, user initiated protection switches involve a bridge (switch) of the source traffic onto the stand-by path while the main path is still active i.e. also carrying the source traffic. Network equipment at the destination node then selects and switches to the stand-by path.

For example, with reference to FIG. 1, data traffic (not shown) may be transported from a traffic source A to a traffic destination B via a main path comprising path sections 14a, 14b and 14c, and via a stand-by path comprising path sections 14d, 14e, 14f and 14g. In the case where network 10 operates a Permanently Bridged protection scheme, traffic is transmitted on both the main and stand-by paths all of the time. The network equipment (not shown in FIG. 1) at the protection closure point, node 12B, receives the data traffic via both the main and the stand-by paths and selects the best path for output to traffic destination B, which may be a further network node or a local terminal (not shown). In the case where the network 10 operates a Shared protection scheme, the traffic is only transmitted on both main and stand-by paths simultaneously in the event of a user-initiated protection switch, and only until the equipment at node 12B switches to the stand-by path.

Protection switching in Permanently Bridged protection schemes and user-initiated protection switching in Shared protection schemes both give rise to traffic hits as a result of a differential time delay between the main and stand-by paths. The differential time delay can arise as a result of different physical characteristics of the respective main and stand-by paths, most notably differences in the length of optical fibre (in the case of optical networks) that traffic must travel along on the respective paths. Typically, a delay of 5 us is incurred per kilometer of fibre in an optical network. Thus, if the traffic on the stand-by path is delayed in time relative to the traffic on the main route, then some data frames that have already been passed through the output port to the traffic destination will be repeated in the event that protection switching occurs in favour of the stand-by path. Alternatively, if the traffic on the stand-by path is advanced in time relative to the traffic on the main route, then when the stand-by path is selected some data frames will be lost and will not reach the traffic destination. Both of these eventualities cause the traffic destination to incur a traffic hit.

For example, in the simplistic network 10 shown in FIG. 1, a data frame, transmitted simultaneously from node 12A along both the main and stand-by paths, may travel several kilometers more by travelling from node 12A to node 12B along the stand-by path 14d, 14e, 14f, 14g, than by travelling along the main path 14a, 14b, 14c. Thus, the data frame arriving at node 12B from the stand-by path will arrive some time later than its counterpart which travelled along the main path.

Hence, if the equipment at node 12B switches from the main path to the stand-by path, a number of data frames that have already been transmitted to the traffic destination B (from the signal that arrived on the main path) are transmitted again since the stand-by path signal lags behind the main path. Alternatively, if traffic travelling on the main path lags behind the traffic travelling on the stand-by path, then, when the equipment at node 12B switches from the main path to the stand-by path, a number of data frames are lost i.e. are never sent to the traffic destination B, since the traffic on the stand-by path is a number of frames ahead of the traffic on the main path. The number of frames that are repeated or lost depends on the size of the differential time delay.

Figure 2:
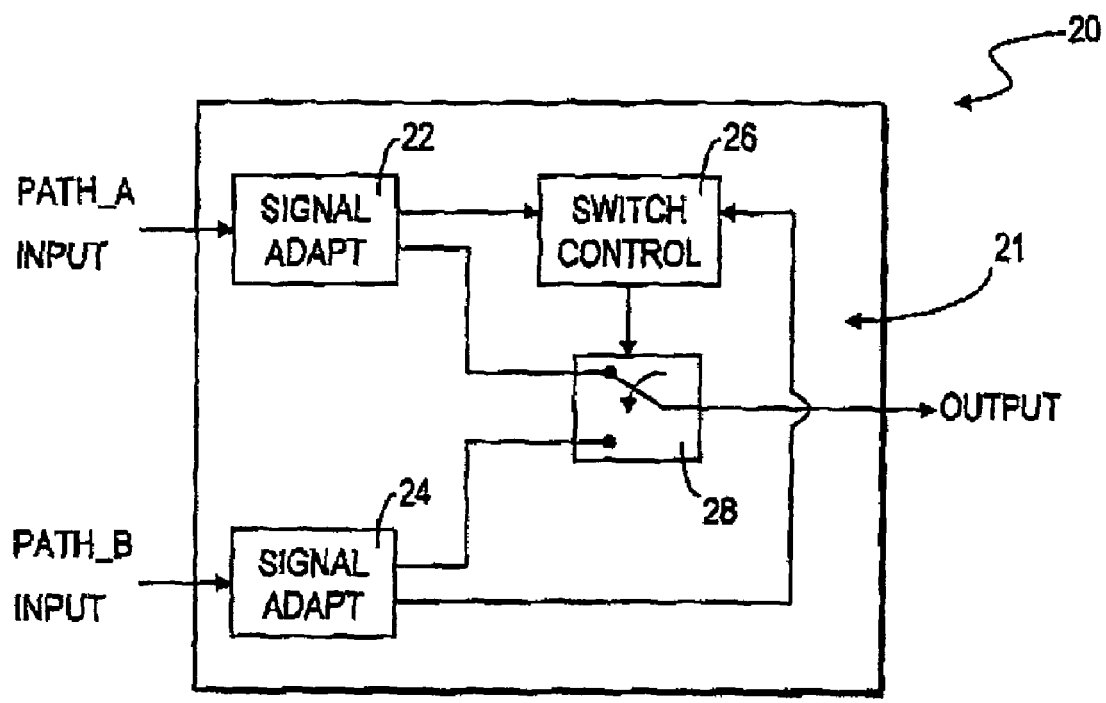
FIG. 2 is a schematic view of a synchronous transmission apparatus including a conventional switching apparatus.

FIG. 2 shows a schematic representation of a conventional synchronous transmission apparatus, generally indicated at 20, suitable for use as the network node 12B. The synchronous transmission apparatus 20 may take the form of, for example, a multiplexer, a cross-connect, or a regenerator. For reasons of clarity, only those components of the apparatus 20 that are necessary for understanding the invention are shown.

The apparatus 20 is arranged to receive data traffic from two transmission paths, namely a main path PATH_A and a stand-by path PATH_B. The apparatus 20 comprises a respective signal adaptor 22, 24 for receiving traffic from each transmission path PATH_A, PATH_B. The signal adaptors 22, 24 are arranged to adapt the incoming data signals on PATH_A and PATH_B to the timing of the local node 12 i.e. the timing of the apparatus 20. The signal adaptation process is commonly referred to as pointer processing. In SDH or SONET transmission systems, the adaptation process also known as SDH/SONET termination.

Pointer processing/signal termination is well known and conventional methods for achieving this are described in ITU-T standards including ITU-T G.707 and G.783, which are hereby incorporated herein by reference.

During signal adaptation, it is normal to perform quality checks in respect of each transmission path. This is done in conventional manner by examination of the relevant bytes of the respective path overhead (POH) for each transmission path. For example, in SDH systems where the transmission path comprises VC-1 (including VC-12, VC-11) or VC-2 structures, the V-5 byte of the POH includes two bits, normally referred to as BIP-2, that are used for error performance monitoring using a Bit Interleaved Parity (BIP) check on all the bytes in the previous VC-2/VC-1. Alternatively, where a path comprises VC-3 or VC-4 data structures, the POH comprises a byte, normally referred to as the B3 byte, that provides bit error monitoring over the path using an even bit parity code, BIP-8. This information is described in detail in ITU-T G.707.

In the apparatus 20, quality checks on PATH_A and PATH_B are made by the respective signal adaptors 22, 24, in conventional manner. The apparatus 20 further includes a switching apparatus, generally indicated at 21, comprising a selector mechanism in the form of a switch controller 26, and a switch device 28. Each signal adaptor 22, 24 provides information on the quality of the respective paths to the switch controller 26. The switch controller 26 is arranged to determine which path is of the higher quality and then to cause that path to be selected as the output (OUTPUT, FIG. 2) of the apparatus 20. In its simplest form, the switch controller 26 comprises a comparator device for comparing the respective quality information of each path. The switch controller 26 controls the switch device 28 to select the higher quality path as the output. For example, for a Permanent Bridge protection scheme, the main path, PATH_A, is normally selected by the switch 28 (as shown in FIG. 2). However, when the switch controller 26 detects that the quality of the stand-by path PATH_B is better than for PATH_A, then the switch controller 26 causes the switch 28 to select PATH_B. PATH_B remains selected until the switch controller 26 determines that PATH_A is of higher quality.

As described above, a problem with this conventional arrangement is that traffic hits due to differential time delays between PATH_A and PATH_B are normally incurred.

To address this problem, and in accordance with the present invention, the respective data signals carried by the main and stand-by paths PATH_A, PATH_B are aligned, or re-aligned, before protection switching is performed. In this way, the switch device selects between corresponding elements, conveniently data containers, of the respective data signals on each path.

Figure 3:
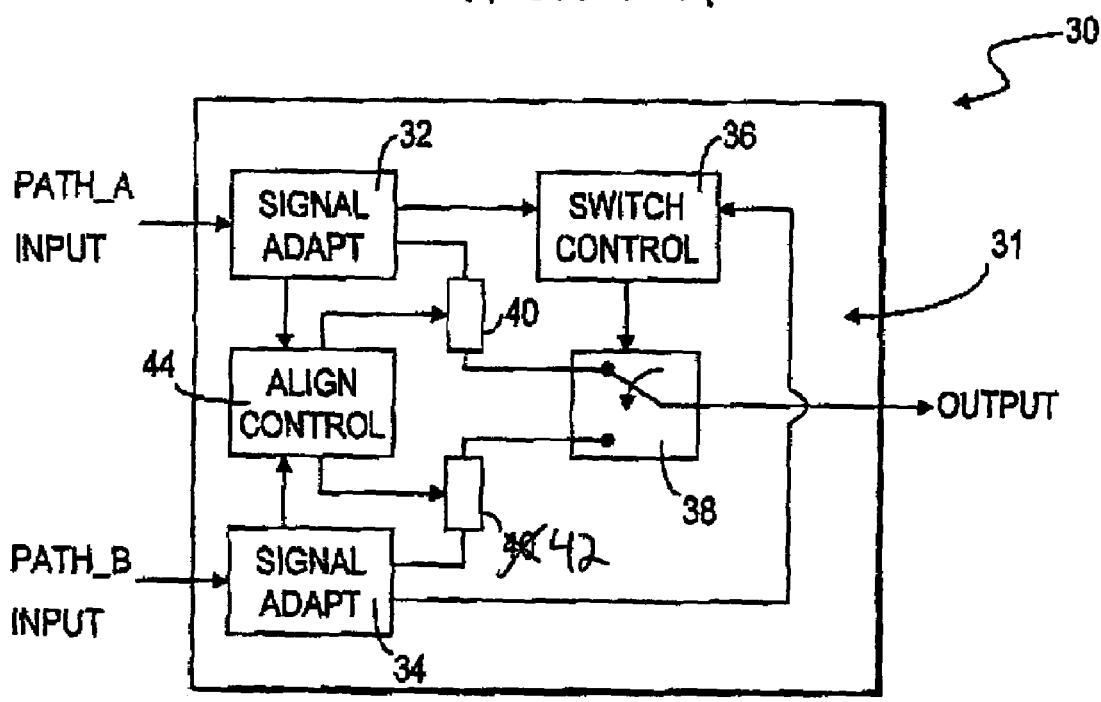
FIG. 3 is a schematic view of a synchronous transmission apparatus comprising a switching apparatus according to one aspect of the present invention.

FIG. 3 shows a schematic representation of a synchronous transmission apparatus, generally indicated at 30, arranged in accordance with the invention. The apparatus 30 is generally similar in construction to the conventional apparatus 20 of FIG. 2. The apparatus 30 comprises a respective signal adaptor 32, 34 for each input data path PATH_A and PATH_B, and a switching apparatus 31 comprising selector mechanism in the form of a switch controller 36 and a switch device 38, which are arranged to perform the same respective functions as described for the apparatus 20 with reference to FIG. 2.

The apparatus 30 additionally comprises a re-alignment mechanism arranged to re-align the respective data signals from each path with one another. The re-alignment mechanism is arranged to delay the data signal from one path with respect to the data signal from the other in order to compensate for any differential time delay that has arisen. In the embodiment illustrated in FIG. 3, the re-alignment mechanism comprises a respective delay element or buffer 40, 42 associated with each of paths PATH_A and PATH_B. The buffers 40, 42 may conveniently take the form of a data buffer, such as a conventional FIFO (First-In First-Out) memory.

In a network 10 where the differential delay between the main and stand-by paths PATH_A, PATH_B is known and is fixed, the re-alignment mechanism need only comprise the buffers 40, 42. For example, where the buffers 40, 42 comprise FIFOs and the stand-by path PATH_B is known to lag the main path PATH_A by a time differential corresponding to, say, one data frame (125 us in an SDH system), then FIFO 40 is set to delay the data signal received on PATH_A by one data frame. Thus, corresponding data frames from the respective data signals are presented to the switch device 38 at substantially the same time. Hence, when protection switching occurs there is no loss or repetition of data frames at the output and therefore no traffic hit.

In practice, the differential time delay between the main and stand-by paths is not normally fixed. For example, the respective routes that the main and stand-by paths take across the network 10 may change as a result of protection switching sub-networks (not shown) or pointer processing events. Such changes may result in changes in the differential time delay between the main and stand-by paths. For this reason, the re-alignment mechanism preferably includes an alignment controller 44. The alignment controller 44 is arranged to determine the differential delay between the main and stand-by paths and to cause the delay elements 40, 42 to compensate accordingly. To do this, each data element of the data signal on the respective paths is associated with a tag, or identifier, that identifies that data element's place, or position, in the sequence of data elements that comprise the respective data signal. In SDH/SONET systems, this is conveniently performed on a frame-by-frame basis. Thus, the first data frame of each data signal are both associated with a first identifier, e.g. Tag1, the respective second data frames are associated with a second identifier, e.g. Tag2, and so on.

In one embodiment, the alignment controller 44 is arranged to monitor the identifiers of data frames as they are received and processed by the respective signal adaptors 32, 34. When the data frame carrying, say, identifier TagX is detected at one of the signal adaptors 32, 34, the alignment controller 44 measures the time that elapses until the corresponding data frame carrying TagX is detected at the other signal adaptor 32, 34. The alignment controller 44 then configures the delay elements 40, 42 accordingly to compensate for the measured differential delay. Thus, after an initial run-in period, the data signals from both PATH_A and PATH_B are aligned, or synchronised, when presented to the switching device 38. The alignment process may be repeated periodically to allow for changes in the differential time delay.

Alternatively, the alignment controller 44 may be arranged to control the FIFOs 40, 42 such that whichever FIFO 40, 42 receives the data frame carrying a given identifier, say, TagX first, holds said data frame in the FIFO 40, 42 until the other FIFO 40, 42 has received the corresponding data frame carrying TagX. The alignment controller 44 then controls the FIFOs 40, 42 so that the respective TagX data frames are output from the FIFOs 40, 42 at the same time. Thus, after an initial run-in period, the data signals from both PATH_A and PATH_B are aligned, or synchronised, when presented to the switching device 38. As before, the alignment process may be repeated periodically to allow for changes in the differential time delay.

The tagging of data frames is conveniently performed using known Virtual Concatenation techniques. Virtual Concatenation is an SDH/SONET technology that allows data signals to be spread across multiple SDH/SONET data containers which can then be transported separately across a transmission infrastructure. As a result, the containers do not necessarily arrive at their destination in the correct sequence. Therefore, the network equipment at the destination must re-align the containers in order to construct the original data signal. To enable re-alignment, the data frames of the original data signal are numbered, or tagged, at their transmission source, i.e. by the network equipment that transmits the original data signal. In particular, each virtual container of a data signal is provided with a identifier in its path overhead that identifies the data frame to which it belongs. Virtual Concatenation is described in ITU-T G.707 (in particular G.707/Y.1322 (10/00) which is hereby incorporated herein by reference.

In a preferred embodiment of the present invention, therefore, Virtual Concatenation techniques, namely the numbering of data frames at the transmission source to allow re-alignment at the destination, are used in the field of protection switching to facilitate re-alignment of corresponding data frames from the main and stand-by transmission paths and thereby to compensate for the effects of differential delay.

Referring again to FIG. 1, the node 12A, which in the present example is the transmission source, is arranged to implement a Virtual Concatenation numbering, or tagging, scheme to source traffic (not shown) received from the source A. The Virtual Concatenation numbering scheme is conveniently applied in conventional manner in accordance with ITU-T G.707. The tagged source traffic is then launched by node 12A on both the main path 14*a*, 14*b*, 14*c* and the stand-by path 14*d*, 14*e*, 14*f*, 14*g*. In this way, corresponding data containers (Virtual Containers in SDH systems) on both the main and stand-by paths are accorded the same respective frame ID, or frame number, and Sequence ID at the transmission source. In accordance with Virtual Concatenation, this information is carried in the respective path overhead (POH) of the virtual containers. Virtual Concatenation assigns data frames to groups, the Sequence ID indicating where a given frame lies in a group. For the purposes of the invention, Sequence ID may be set to zero for all data frames, indicating that each group comprises only one data frame. For Virtual Concatenation schemes that also employ a 'type' tag (known in virtual concatenation as a control code), type may be set to 'last' for each data frame to indicate that each frame is the last in its respective group. The apparatus at the destination node 12B treats all data containers with the same frame number and sequence ID as a protection group (it is possible to have more than one stand-by container). This means that, for example, in cases where there are several stand-by containers (each having arrived on a respective stand-by path) the destination node is arranged to select between all virtual containers belonging to the same protection group since these containers are corresponding elements of the signals received on the main and respective stand-by paths. The Virtual Concatenation scheme also allows the transmission paths to be closed at intermediate points in the network and then relaunched. It is possible to introduce the Virtual Concatenation numbering scheme at a point in the network other than the source at which the paths were created. If this approach is adopted, the path overheads may be adjusted to accommodate changes caused by the introduction of the Virtual Concatenation numbering scheme.

Thus, each data container arriving at node 12B on the main path 14*a*, 14*b*, 14*c* is associated with a respective frame ID, or number, that identifies to which data frame of the source data signal it belongs. Each corresponding data container arriving on the stand-by path 14*d*, 14*e*, 14*f*, 14*g*, is associated with the same respective frame ID.

Figure 4:
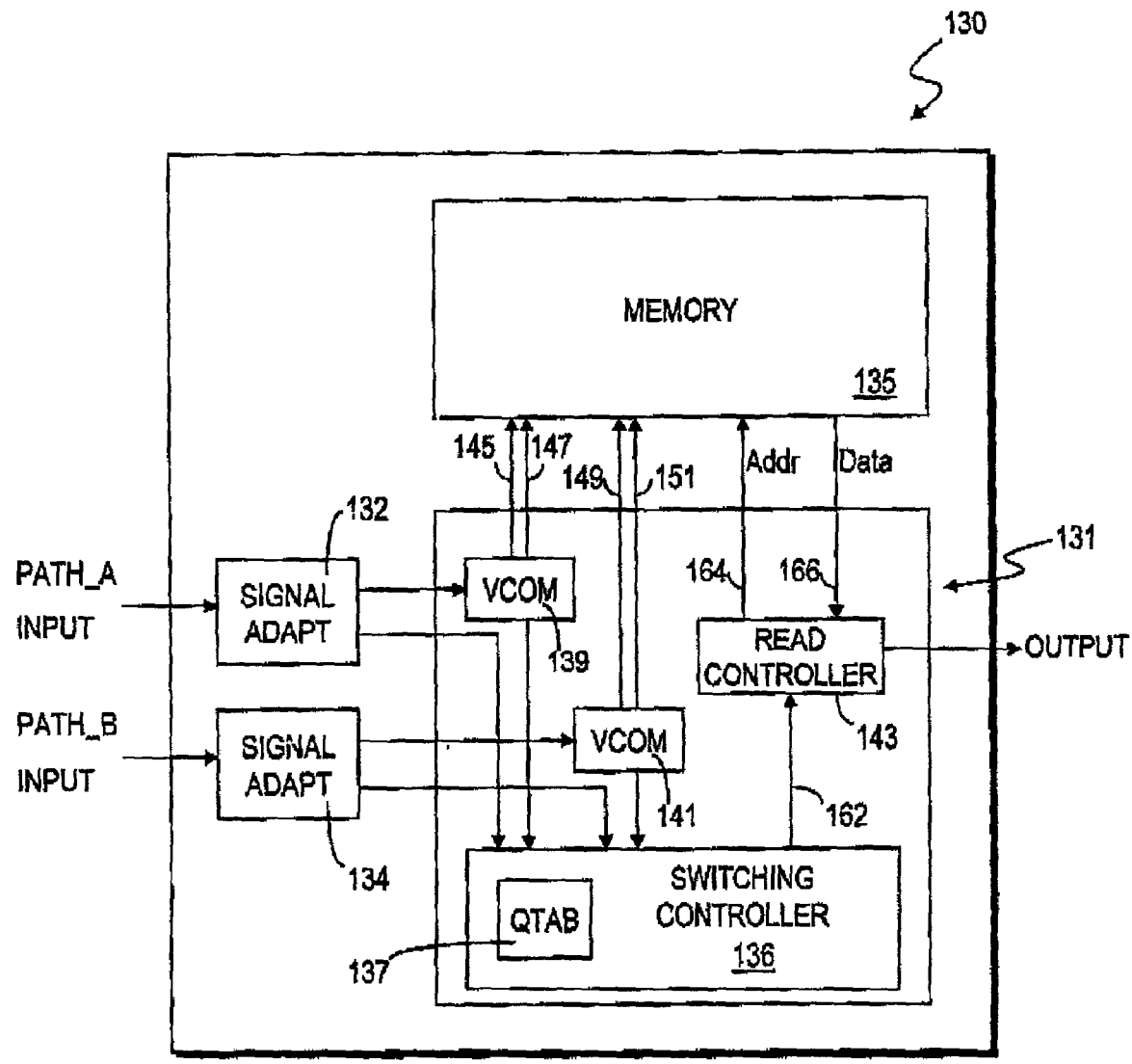
FIG. 4 is a schematic view of a synchronous transmission apparatus including a preferred embodiment of the switching apparatus in FIG. 3.

FIG. 4 shows a schematic view of a preferred embodiment of the apparatus of FIG. 3 (indicated as 130 in FIG. 4) for re-aligning the data signals on the main and stand-by paths, and performing protection switching. The embodiment of FIG. 4 is suitable for use at node 12B.

The apparatus 130 comprises respective inputs for receiving data signals on the main path PATH_A and the stand-by path PATH_B, and an output OUTPUT for providing a protection switched data signal to the traffic destination (destination B in FIG. 1). The apparatus 130 comprises a respective signal adaptor 132, 134 for each incoming transmission path PATH_A, PATH_B. The signal adaptors 132, 134 perform the SDH/SONET termination operations, or pointer processing as described for the signal adaptors in FIGS. 2 and 3. As part of the SDH/SONET termination process, the signal adaptors 132, 134 identify the bytes within the overall payload (e.g. an STM-1) that belong to the particular traffic channel (e.g. a VC-12) that is being protected by the main and stand-by paths. All bytes of the channel, including the path overhead bytes, are marked during the termination process in conventional manner.

The apparatus 130 further includes switching apparatus, generally indicated at 131, according to the invention which comprises a selector mechanism in the form of a switching controller 136, and a switch device 143. The switch device 143 takes the form of a read controller. The apparatus 130 also includes, or is cooperable with, a buffer device, or storage device 135. The storage device 135 preferably comprises a memory device such as a Random Access Memory e.g. a Dynamic or Static Random Access Memory (DRAM or SRAM). The switching controller 136 includes, or is otherwise associated with, a storage device 137. In FIG. 4, the storage device 137 is labelled QTAB and is shown within the switching controller 136, although this need not necessarily be the case. For example, the storage device 137 may also take the form of a RAM.

The read controller 143 is arranged to read, under the control of the switching controller 136, data from the storage device 135 and output the retrieved data. The read controller 143 preferably takes the form of a memory reading device.

The apparatus 130 also includes a respective path overhead monitor and write controller 139, 141, arranged to receive the processed data channel from a respective signal adaptor 132, 134. In FIG. 4, the path overhead monitor and write controllers 139, 141 are labelled as VCOM (Virtual Concatenation Overhead Monitor).

The VCOMs 139, 141 are arranged to locate the byte of the respective processed data channel that contains the frame ID tag. In accordance with standard Virtual Concatenation this information is included in the virtual concatenation overhead data which is located in the H4 byte for high order payloads (e.g. VC-4) or in the K4 byte for low order payloads (e.g. VC-12). The VCOM 139, 141 is arranged to provide the virtual concatenation overhead data, in particular the frame number, to the switching controller 136. The VCOM 139, 141 may be arranged to send the entire H4/K4 byte (as applicable) to the switching controller 136, or alternatively may be arranged to extract the frame number from the H4/K4 byte, and provide only this information to the switching controller 136.

The switching controller 136 is also arranged to receive from the signal adaptors 132, 134 information concerning the quality of the respective paths PATH_A and PATH_B (data line 153 in FIG. 4). The signal adaptors 132, 134 extract the quality information, including fault data and error data, from the respective data signals, or data channels, in conventional manner. The quality information conveniently comprises the parity information included in the path overhead of the data containers being switched.

Figure 6:
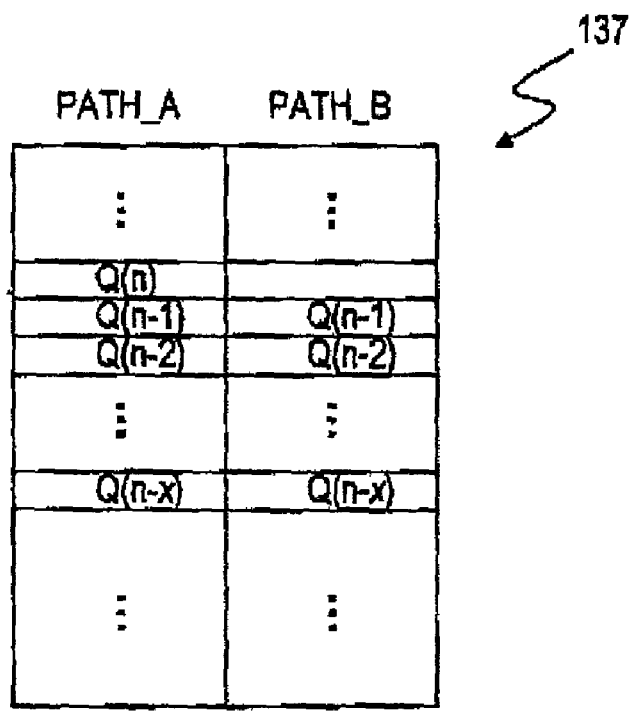
FIG. 6 is a schematic representation of a storage device containing signal quality information.

The switching controller 136 stores the respective quality data for each frame and in respect of both paths PATH_A and PATH_B in the storage device 137. Conveniently, this information may be stored in tabular form as shown in FIG. 6. As can be seen from FIG. 6, the table stores a respective frame quality indicator Q for each data frame of both the main and stand-by paths PATH_A, PATH_B. Quality indicator Q(n) in the column PATH_A represents the quality of frame n of the data signal on PATH_A, Q(n−1) in column PATH_B represents the quality of frame n−1 of the data signal on PATH_B, and so on, where n corresponds to the frame number, or frame ID, with which the respective frames are tagged.

The VCOMs 139, 141 are also arranged to store data from each frame from the respective paths PATH_A, PATH_B in a respective storage area in the storage device 135. To this end, each VCOM 139, 141 has a respective address line 145, 149 and respective data line 147, 151 for communication with the storage device 135. For each data frame, the VCOM 139, 141 uses the respective frame numbers to address, or locate, the respective storage area in the storage device 135 allocated to that frame. The VCOM 139, 141 then stores the data for each frame in the respective storage area via data line 147, 151 respectively. The storage device 135 thus provides a respective buffer for receiving data from successive data frames from the respective paths PATH_A and PATH_B.

Figure 5:
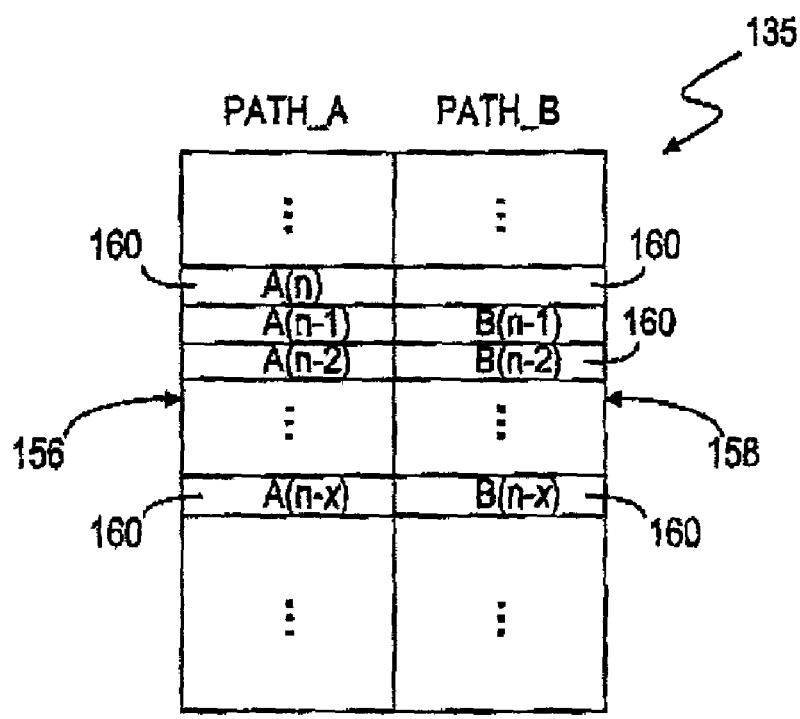
FIG. 5 is a schematic representation of data buffers implemented in a memory device.

FIG. 5 shows a schematic representation of the storage device 135 in which the storage device 135 comprises a respective data buffer 156, 158 for PATH_A data frames and PATH_B data frames. Each buffer 156, 158 comprises a plurality of storage areas 160, one for each data frame. In the example illustrated in FIG. 5, in the buffer 156 for PATH_A, the uppermost (as viewed in FIG. 5) storage area 160 holds the data, A(n), for frame n of the PATH_A data signal, the preceding storage area 160 holds the data, A(n−1), for the previous frame n−1), and so on. It is assumed for illustrative purposes that the data signal on PATH_B lags the signal on PATH_A by one data frame. In the buffer 158 for PATH_B, therefore, the storage area 160 corresponding to frame n is empty since frame number n−1 is the latest received frame on PATH_B. Buffering the data frames allows the respective main and stand-by data signals to be re-aligned to compensate for a differential time delay as is described below.

The switching controller 136 is responsible for selecting which of the main and stand-by data paths PATH_A, PATH_B is to be output to the traffic destination and for causing the selected data to be output. In the preferred embodiment, the switching controller 136 operates on a frame-by-frame basis and, using the quality data stored in the storage device 137, compares the quality of the data frame received on PATH_A with the quality of the corresponding data frame from PATH_B. For each frame, the switching controller 136 selects the path from which the data is indicated as being of better quality. Preferably, the switching controller 136 is arranged to perform the comparison/selection operation at least one frame behind the lagging transmission path to ensure that the storage devices 136, 137 hold data in respect of both paths for the frame being analysed. For example, in FIGS. 5 and 6, PATH_B is assumed to lag PATH_A by one frame. Thus, the respective frame data and quality data is available in respect of frames up to and including frame n for PATH_A (A(n), Q(n)), but not for PATH_B, for which the information is only available for frames up to and including frame n−1.

In general, the switching controller 136 is arranged to operate at frame n−X, where X is at least equal to the number of frames by which the lagging path lags the leading path. Thus, for frame n−X, the switching controller 136 compares the respective quality data Q(X) for each path PATH_A and PATH_B and determines which path contains the better copy of the frame data for frame n−X. The switching controller 136 then provides the read controller 143, via data line 162, with information identifying the frame number n−X and the path that it has selected as being of better quality for that frame number.

The read controller 143 is responsible for retrieving data in respect of each frame from the storage device 135 under the direction of the switching controller 136. The read controller 143 uses the information provided by the switching controller 136 to determine the start address of the storage area 160 containing the selected frame data. The read controller 143 then addresses the appropriate storage area 160, via address line 164, retrieves the frame data contained in the addressed storage area 160 via data line 166 and provides the retrieved data to the output.

The switching controller 136 repeats the comparison/selection process for each subsequent frame (n–X+1, n–X+2 and so on), the selected frame data being retrieved and output by the read controller 143 as described above. The output of the apparatus 130 therefore comprises data from the selected data frames in sequential order according to the position indicated by their respective tags. The switching controller 136 and the read controller 143 may be arranged to operate at a rate compatible with the frequency of the incoming data signals on paths PATH_A and PATH_B so that the output data signal OUTPUT is provided at substantially the same frequency as the input data signals.

The preferred embodiment of the apparatus 130 as described above is arranged to operate on only one channel from each received data frame. Thus if, for example, a received data frame is an STM-1 frame comprising 63 VC-12s (each VC-12 potentially serving as a separate channel), then the signal adaptors 132, 134 are arranged only to provide one VC-12 from the respective main and stand-by paths to the respective VCOMs 139, 141, and to provide quality information to the switching controller 136 in respect of said respective one VC-12 (the quality information being extracted from the path overhead of each VC-12 in conventional manner). The VCOMs 139, 141 therefore store in the memory 135 only one VC-12 in respect of each frame In accordance with standard Virtual Concatenation techniques, each VC-12 has a frame ID (as part of its Virtual Concatenation Overhead) included in its path overhead identifying to which frame that VC-12 belongs. This allows the VCOMs 139, 141 to store and process the VC-12s on a frame-by-frame basis. The switching controller 136, in deciding which of the main and stand-by paths to select, makes a comparison between the quality of VC-12s from corresponding frames of the signals received on the main and stand-by paths. Hence, the apparatus selects between, or switches between, corresponding data containers but on a frame-by-frame basis. The read controller 143 is then caused to output the selected VC-12 in relation to each frame. The other VC-12s of each data frame may be terminated at the signal adaptors 132. In such an embodiment, the apparatus 130 performs path protection on only one channel of the incoming data frames. If protection is required on more than one channel, then each channel that requires protection may be processed by a respective instantiation of the apparatus of the invention.

At the output, the output data in respect of each frame (which in the preferred embodiment comprises data for only one channel, e.g. a VC-12 or VC-4) may be incorporated into a standards compliant data frame for output to a synchronous transmission apparatus or system. For example, an output VC-12 may be incorporated into an STM-1 frame where some or all of the other 62 VC-12s are declared unassigned or AIS. Alternatively, the output VC-12 may be combined with other output channel data (from for example other instantiations of the apparatus) to form a data frame.

The arrangement described above applies equally to signals of other compositions e.g. STM-N frames comprising high order or low order virtual containers.

In an alternative embodiment of the invention, the apparatus may be arranged to operate on multiple channels by means of time division multiplexing.

Since the switching controller 136 always selects between corresponding frames (i.e. having corresponding tags) from PATH_A and PATH_B i.e. frames that carry the same data, then there is no loss of data frames or repetition of data frames when the switching controller 136 causes switching from one transmission path to the other. Thus, after an initial run-in period in which a number (at least as many as the number of frames by which the data signal on one path lags the data signal on the other) of data frames are read into the respective buffers 156, 158, the apparatus 130 produces an output signal OUTPUT that does not incur a traffic hit when protection switching is performed. Hence, by buffering the respective data signals on the main and stand-by paths, the apparatus 130 is able to re-align the data signals and thereby to perform hitless protection switching between the two paths.

Further, with a conventional switching mechanism, there is normally an error threshold below which a switch controller does not perform protection switching because the actual act of protection switching is likely to cause a loss of signal quality greater than that resulting from the errors present in the currently selected data signal. Thus, a selected, or active, data signal may suffer a relatively low Bit Error Rate (BER), commonly known as a dribbling error, without causing protection switching to be performed. However, with the apparatus 130 of the present invention, no traffic hit is incurred when protection switching is performed and so the apparatus 130 can readily switch between the main and stand-by paths to substantially reduce, or eliminate, dribbling errors and the like. Moreover, because the apparatus 130 operates on a frame-by-frame basis, i.e. the apparatus 130 can readily switch between the main and stand-by paths from frame to frame, the overall quality of the output signal OUTPUT is further increased.

Thus, an important advantage of the invention is that it allows a path to be chosen on a frame-by-frame basis in real time unlike conventional protection schemes which allow dribbling errors below a signal degrade threshold. The invention therefore not only affords hitless protection switching but also offers very low end to end BER performance without utilising extra network resources. For example, consider a dedicated protection scheme with two distinct transmission paths operating at 2.5 GHz where the path level BER is 1 in 1E12 ($1E12 \equiv 1 \times 10^{12}$). The number of bits per frame is 2.5 G/8000=312500. The probability of a frame error is therefore 1 in 1E12 by 312500 which is 1 in 1.32E6. Because the invention allows protection switching on a frame-by-frame basis, to calculate the output BER it is necessary to calculate the probability of having a simultaneous frame error on both paths (i.e. the square of the path frame error rate) which in this case is 1 in 1.024E13. For a 2.5 GHz signal, this corresponds to one error approximately every 40 years.

It will be understood that the invention is applicable to both Permanently Bridged Protection schemes and to Shared Protection schemes. In a Permanently Bridged scheme, the main path and the stand-by path are permanently available and so protection switching can be performed on a frame-by-frame basis as described above. In a conventional Shared Protection scheme, upon initiation by a user of a protection switch operation, the source traffic is bridged onto a stand-by path and so the destination node (12B in FIG. 1) receives both a main and a stand-by data path until the switching operation has actually taken place.

In the hitless scheme of the invention, the virtual concatenation tag is applied to the main path at the source node on path creation (as described above). The stand-by path does not exist until the user requests a switch operation. At such time, the main path with virtual concatenation tags is bridged on to the shared protection resource path to create the stand-by path.

At the destination node the main and initially absent stand-by path are passed through a virtual concatenation buffer (as described in connection with the apparatus 130) which is normally empty. As before, the function of the buffer is to remove differential delay on main and stand-by paths when a switch operation is performed. When the user requests a switch, the source node performs a bridge operation and the two paths are presented to the destination node. These paths will have a differential delay and the path that travels the shortest route requires buffering to delay it to align it with the path on the longer route. If the short path is the newly created stand-by path then the buffer can be filled instantaneously (without special control) and the two paths aligned. If the short path is the active main path then the buffer cannot be filled instantaneously, rather the buffer is filled by slowing down the live output traffic by introducing output pointer movements (This mechanism ensures the payload stays within the SDH timing specification and is not damaged). The output pointer movement causes less traffic to be written out every frame and the virtual concatenation buffer starts to fill. When the buffer is suitably filled the two paths are aligned and the switch is performed hitlessly. The unused path is torn down and the virtual concatenation buffer emptied using output pointer movements.

Thus, the apparatus 30, 130 of the invention can then be used to effect the switch from the main path to the stand-by path without incurring a traffic hit in a similar manner as described above.

It will be understood that the invention is suitable for use with data signals carrying either high order payloads (e.g. VC-4s) or low order payloads (e.g. VC-12s). Thus, in addition to its ability to protect a single VC-n/VTn or STS-n, the apparatus of the invention may be used to protect a VC-4or STS-1 , which in turn is carrying low order traffic. This enables one protection function to protect up to 84 (in the case of a VC-4carrying VC-11s separate channels.

This operation is possible because the overhead added to a VC-4to support virtual concatenation, and which is used in the preferred embodiment of the invention, is a superset of the overhead added to support the transportation of low order payloads such as VC-12s or VT1.5s. A VC-4 or STS-1 carrying a low order payload (e.g. VC-12 or VT1.5) employs a 4 frame multiframe to transport the data. Each VC-4 frame therefore carries only one quarter of the data, and requires an identifier to indicate which quarter this is. This identifier is provided by the H4 byte. The bottom two bits are required to perform a binary count of 0, 1, 2, 3, 0, 1, 2 etc. The frame which is received after an H4 of 0 is the first frame of the multiframe. When carrying low order traffic, the upper 6 bits of H4 are undefined.

With virtual concatenation, the overhead is transported in a 16 frame multiframe, with the overhead information carried in the top 4 bits, and the multiframe identifier carried in the lower 4 bits. The multiframe identifier (see ITU-T G707 MFI1) is a modulo 16 binary count 0, 1, 2 . . . , 15, 0, 1 etc. It may be seen that if a 4 bit binary counter is implemented in the H4 byte, then the bottom two bits will appear to be acting as a 2 bit binary counter, as required for the transport of low order structures.

It is therefore possible to use a VC-4 or STS-1 with a virtual concatenation overhead to transport low order traffic. At the receiving node, the two or more VC-4s or STS-1s received from the transmitting node are passed to the apparatus of the invention. The apparatus selects the best path, or frame, and outputs this to a low order processing block (not shown). The low order processing function will use the bottom 2 bits of the received H4 to determine the multiframe structure, and extract the low order traffic. The top 6 bits of the H4 byte will be ignored.

The invention is also suitable for use with virtually concatenated data signals as defined by G.707, such as the VC-4-2V which comprises two concatenated VC-4s. In this case, each transmission path comprises two data lines (one for each VC-4 channel) and the storage devices 135, 137 comprise respective entries for the frames of each VC-4 channel of each path. The switching controller selects which data is to be output on a frame by frame basis substantially as described above with reference to FIG. 4, except that in this case the better quality frame data is selected for each of the concatenated VC-4 signals such that the output signal also comprises a virtually concatenated signal.

The switching controller 136, read controller 143, storage device 137 and VCOMs 139, 141 may conveniently be implemented as an integrated circuit in, for example, an Application Specific Integrated Circuit (ASIC) or a Field Programmable Gate Array (FPGA). The memory 135 is conveniently an external RAM (i.e. external to the integrated circuit) but may alternatively be provided inside of the ASIC. Similarly, the memory 137 may be internal or external to the ASIC/FPGA as is convenient. The signal adaptors 132, 134 are conventional and are normally present in network nodes of a synchronous transmission system.

In the preferred embodiment of the invention described above, the switching apparatus selects and switched between data containers on a frame-by-frame basis. This is preferred because in SDH/SONET quality information in the form of parity information is available for each frame. Also, in accordance with the virtual concatenation scheme employed in the preferred embodiment, each data container carries information relating to the frame to which it belongs. However, a skilled person will appreciate that in an alternative embodiment, data containers may by switched on a multiple frame basis or a sub-frame basis, as is desired.

Although the invention is described herein primarily in the context of SDH systems, a skilled person will appreciate that the invention is equally applicable to other synchronous systems, for example SONET. Moreover, the invention may be employed in any system or apparatus that employs synchronous framing for transporting data, for example an ATM (Asynchronous Transfer Mode) apparatus having SDH/SONET ports. It will further be appreciated that the invention may be used to provide hitless switching in non-synchronous systems by introducing an appropriate tagging scheme for non-synchronous signal elements (e.g. ATM cells).

It will also be appreciated that the invention may be employed where there are more than one stand-by paths to select from.

The invention is not limited to the embodiments described herein which may be modified or varied without departing from the scope of the invention.

What is claimed is:

1. A switching apparatus arranged to receive data signals on a main transmission path and at least one stand-by transmission path, each path carrying, in use, a substantially identical data signal, and to output data from a selected one of said transmission paths, each data signal being comprised of data frames, each data frame comprising at least one data element, the apparatus including a selector mechanism for selecting between transmission paths, wherein each data element is associated with an identifier that identifies to which data frame it belongs, the apparatus being arranged to align the respective data signals received on said transmission paths by causing said selector mechanism to select between transmission paths by selecting between a respective data element from each path wherein the associated identifiers of said respective data elements indicate that said respective data elements belong to the same data frame.

2. An apparatus as claimed in claim 1, wherein said signal alignment is achieved by buffering the received data signals.

3. An apparatus as claimed in claim 2, wherein the apparatus is arranged to store the elements of each received data signal in a respective data buffer.

4. An apparatus as claimed in claim 3, wherein the data buffers are implemented in one or more memory devices.

5. An apparatus as claimed in claim 3, wherein the data buffers are implemented in Random Access Memory (RAM).

6. An apparatus as claimed in claim 3, wherein the selector mechanism comprises a switching controller arranged to select between transmission paths, and a switch device arranged to retrieve at least one signal elements from the data buffer corresponding to the selected transmission path and to cause said at least one retrieved signal element to be output.

7. An apparatus as claimed in claim 6, wherein the switching controller is arranged to select between transmission paths in respect of each signal element.

8. An apparatus as claimed in claim 7, wherein the switching controller is arranged to compare the quality of corresponding respective signal elements from each received data signal and to cause the switch device to retrieve the signal element having better quality.

9. An apparatus as claimed in claim 6, wherein the switch device comprises a memory reading device.

10. An apparatus as claimed in claim 1, wherein each identifier includes information indicating the position of the respective data element in the data signal, the selector mechanism being arranged to cause said output data to comprise said selected elements in sequential order according to the positional information indicated by the respective identifier.

11. An apparatus as claimed in claim 10, wherein said identifiers comprise virtual concatenation overhead bits.

12. An apparatus as claimed in claim 1, wherein said selector mechanism is arranged to select between corresponding signal elements on a frame-by-frame basis.

13. An apparatus as claimed in claim 1, wherein said signal elements comprise data containers.

14. An apparatus as claimed in claim 1, wherein said selector mechanism is arranged to compare the quality of said respective data elements and to select the transmission path associated with the data element of better quality.

15. An apparatus as claimed in claim 1, wherein the apparatus is arranged to store information concerning the quality of at least one element of each received data signal.

16. An apparatus as claimed in claim 1, being arranged for use in a synchronous transmission system.

17. An apparatus as claimed in claim 1, wherein said identifiers comprise Virtual Concatenation overhead bits.

18. A synchronous transmission apparatus comprising a switching apparatus arranged to receive data signals on a main transmission path and at least one stand-by transmission path, each path carrying, in use, a substantially identical data signal, and to output data from a selected one of said transmission paths, each data signal being comprised of data frames, each data frame comprising at least one data element, the apparatus including a selector mechanism for selecting between transmission paths, wherein each data element is associated with an identifier that identifies to which data frame it belongs, the apparatus being arranged to align the respective data signals received on said transmission paths by causing said selector mechanism to select between transmission paths by selecting between a respective data element from each path wherein the associated identifiers of said respective data elements indicate that said respective data elements belong to the same data frame.

19. A synchronous transmission system comprising a first synchronous transmission apparatus arranged to transmit data signals across a network on at least two transmission paths, each data signal being comprised of data frames, each data frame comprising at least one data element; and a second synchronous transmission apparatus arranged to receive said data signals on said at least two paths, wherein the first synchronous transmission apparatus is arranged to associate each element of each transmitted data signal with an identifier that identifies to which data frame it belongs, and wherein said second synchronous transmission apparatus comprises a switching apparatus arranged to receive data signals on a main transmission path and at least one stand-by transmission path, each path carrying, in use, a substantially identical data signal, and to output data from a selected one of said transmission paths, each data signal being comprised of data frames, each data frame comprising at least one data element, the apparatus including a selector mechanism for selecting between transmission paths, wherein each data element is associated with an identifier that identifies to which data frame it belongs, the apparatus being arranged to align the respective data signals received on said transmission paths by causing said selector mechanism to select between transmission paths by selecting between a respective data element from each path wherein the associated identifiers of said respective data elements indicate that said respective data elements belong to the same data frame.

20. A method of switching between transmission paths in a switching apparatus arranged to receive data signals on a main transmission path and at least one stand-by transmission path, each path carrying, in use, a substantially identical data signal, and to output data from a selected one of said transmission paths, each data signal being comprised of data frames, each data frame comprising at least one data element, the method comprising associating each data element with an identifier that identifies to which data frame it belongs; and selecting between transmission paths by selecting between a respective data element from each path wherein the associated identifiers of said respective data elements indicate that said respective data elements belong to the same data frame.

21. A method of switching between transmission paths in a synchronous transmission system comprising a first synchronous transmission apparatus arranged to transmit data signals across a network on at least two transmission paths each data signal being comprised of data frames, each data frame comprising at least one data element; and a second synchronous transmission apparatus arranged to receive said data signals on said at least two paths, the method comprising: associating, at said first synchronous transmission apparatus, an identifier with each element of said data signals, the identifier indicating to which frame the data element belongs; selecting, at said second synchronous transmission apparatus, between transmission paths by selecting between a respective data element from each path wherein the associated identifiers of said respective data elements indicate that said respective data elements belong to the same data frame; and outputting said selected signal elements in sequential order according to the information indicated by the respective identifiers.

* * * * *